(12) United States Patent
Weiman

(10) Patent No.: US 6,416,117 B1
(45) Date of Patent: Jul. 9, 2002

(54) BEAM CONNECTION

(75) Inventor: Martin Weiman, Gothenburg (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/682,714

(22) Filed: Oct. 9, 2001

Related U.S. Application Data

(63) Continuation of application No. PCT/SE00/00661, filed on Apr. 7, 2000.

(51) Int. Cl.⁷ .................................................. B60J 7/00
(52) U.S. Cl. ...................... 296/188; 296/203.03; 296/29
(58) Field of Search ......................... 296/188, 203.01, 296/205, 203.03, 29, 30, 193

(56) References Cited

U.S. PATENT DOCUMENTS

| | | | |
|---|---|---|---|
| 1,512,700 A | 10/1924 | Lambert | |
| 1,629,278 A | 5/1927 | Lambert | |
| 2,164,097 A | * 6/1939 | Tjaarda | ............. 296/203.01 X |
| 4,468,052 A | 8/1984 | Koike | |
| 5,820,204 A | * 10/1998 | Masuda et al. | ............. 296/188 |
| 6,086,141 A | * 7/2000 | Masuda et al. | ............. 296/188 |

FOREIGN PATENT DOCUMENTS

GB      2293354 A      3/1996

* cited by examiner

*Primary Examiner*—Stephen T. Gordon
*Assistant Examiner*—Jason Morrow
(74) *Attorney, Agent, or Firm*—Kilpatrick Stockton LLP

(57) ABSTRACT

A beam knot forming part of a vehicle body structure and being constructed of three beam elements, each disclosing two side walls that extend with relative intervals and a transverse wall that connects the side walls, is disclosed. The beam elements are rigidly connected with each other in the beam knot and protrude from this in respective directions. One of the beam elements discloses a recess in one side wall thereof, another beam element inserts transversely through the recess with a section and is connected with the opposite side wall. A third beam element is partly situated in the first beam element and is, with its side walls, connected with the side walls of the second beam element.

8 Claims, 2 Drawing Sheets

BEAM CONNECTION

CROSS REFERENCE TO RELATED APPLICATIONS

The present application is a continuation of International Application No. PCT/SE00/00661, filed Apr. 7, 2000, which claims priority to Swedish Application No. 9901260-1, filed Apr. 9, 1999.

BACKGROUND OF INVENTION

1. Technical Field

The present invention relates to a beam knot forming part of a vehicle body structure. The beam knot is comprised of at least three beam elements, each disclosing two side walls that extend with relative intervals, and at least one transverse wall that connects the side walls. The beam elements are rigidly connected with each other in the beam knot and protrude from this in respective directions.

2. Background Information

Beam knots in vehicle body structures generally comprising three beam elements connected with each other have been constructed in such manner that two of the beam elements have been connected to a longitudinal beam element with their ends. Generally, a floor panel is included that covers two of the beam elements and supports the third beam element. In this regard, the connection only takes place between two of the beam elements. Furthermore, the connection occurs in one single plane for each connection. Considering the increasingly extensive demands that, for security reasons and other motives, are called for regarding structural strength in vehicle body structures, the known solution discloses an unsatisfying strength due to a limited rigidity and capacity for load transmission between the beam elements.

SUMMARY OF INVENTION

The present invention provides a beam knot that satisfies extensive demands for structural strength, has a long service life, and allows for utilization of efficient assembly methods.

This is achieved by means of a beam knot according to the present invention, wherein a first beam element of the beam elements discloses a recess limited by two side edges in one side wall thereof. A second beam element of the beam elements inserts transversely through the recess with a section and is connected with the opposite side wall of the first beam element. The second beam element discloses a width between its side walls that corresponds to the width of the recess between its side edges. A third beam element of the beam elements is partly situated in the first beam element and, with its side walls, is connected with at least the side walls of the second beam element. The third beam element also connects to the opposite side wall of the first beam element.

By means of the beam knot according to the invention, at least three beam elements are connected directly with each other along more than one connecting plane for each beam element, providing a high degree of rigidity and a satisfying load transmission between the beam elements, as well as a long service life.

BRIEF DESCRIPTION OF DRAWINGS

The invention will be further described herein below with reference to the preferred embodiments and to the appended drawings, in which.

DETAILED DESCRIPTION

In a preferred embodiment, the beam knot according to the invention forms part of a vehicle body structure for motor vehicles, for example a vehicle body structure where the floor structure is connected with the side structures of the vehicle, which comprise standing or vertical beam elements in front of, between or behind the vehicle's doors.

Figure 1:
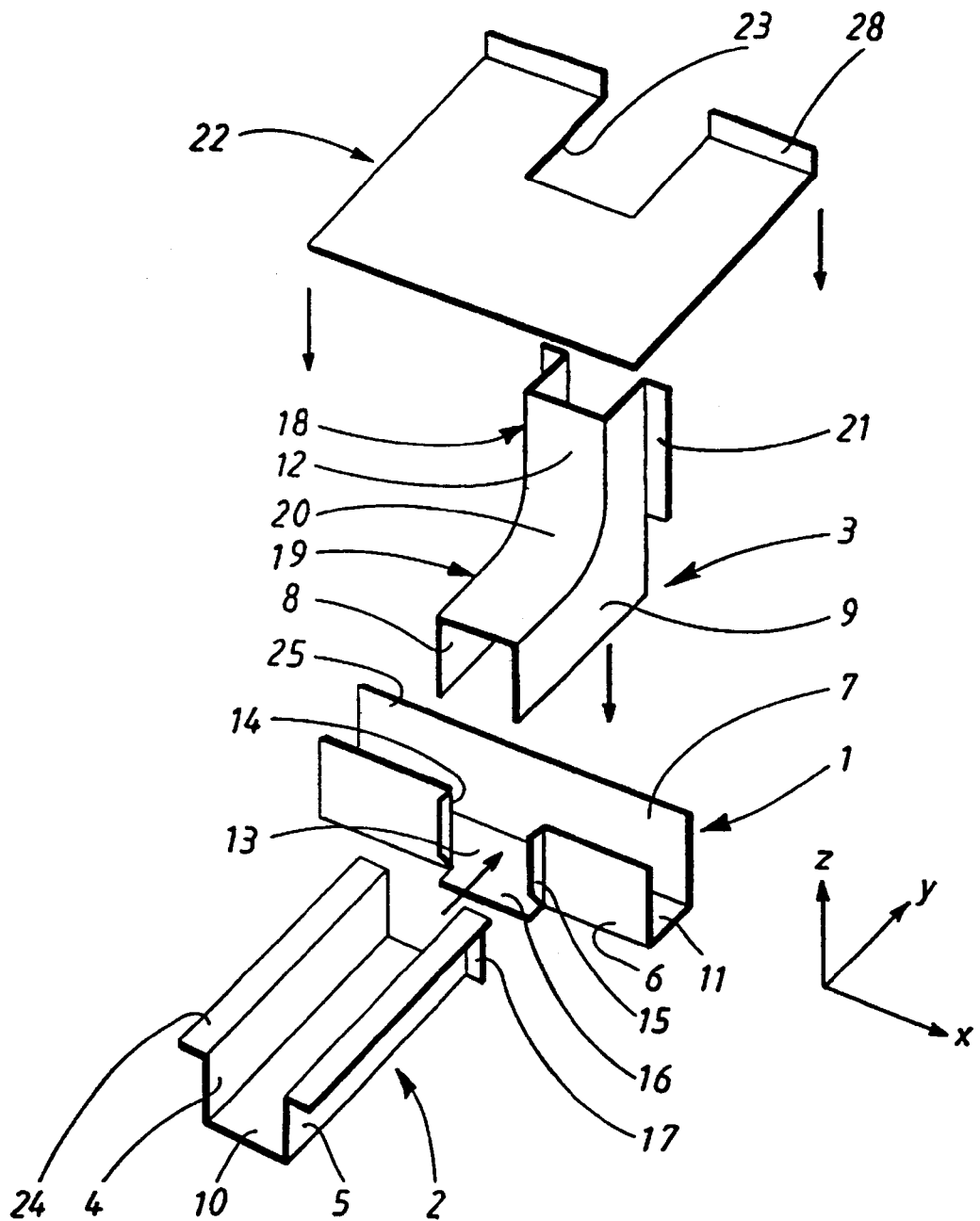
FIG. 1 is an exploded perspective view of one embodiment of the present invention illustrating a schematic example of the elements forming part of the beam knot.

As is best apparent from FIG. 1, the beam knot in the schematically shown example is intended for the assembly of three beam elements. More precisely, the beam knot is intended for the assembly of a first beam element, referred to as the longitudinal beam 1, a second beam element, referred to as the cross beam 2, and a third beam element, referred to as the beam foot 3. In the example illustrated, the longitudinal beam 1 is intended to extend in the longitudinal direction of the vehicle body structure, whereas the cross beam 2 is intended to extend in the latitudinal direction of the structure and the beam foot 3 in the vertical as well as the latitudinal direction. However, depending upon which structure has been selected, the beam knot can be turned in any optional direction so that each beam can have a completely different direction.

Preferably, all of the beams 1, 2, 3 are of the channel beam type, i.e., they have essentially a U-profile form. This is a fundamental condition for at least two of the beams, at least in those sections that are intended to be connected with each other in the assembled beam knot. Thus, each beam discloses two side walls 4, 5, 6, 7, 8, 9 that, in each beam, travel in pairs in parallel planes with a selected relative distance. The side beams in each beam 1, 2, 3 are held together by means of a transverse wall 10, 11, 12 that extends transversely, i.e., essentially at right angles, to the side walls 4, 5, 6, 7, 8, 9. In the two horizontal beams 1, 2, the transverse walls 10, 11 forms a base portion, i.e., the profile form is a U turned the right way round, whereas the third beam 3 has a reversed profile form, i.e., it, in cross-section, forms a reversed U.

In order to define various directions and planes more easily, a coordinate system with xyz-directions has been included in the drawings, where x represents the longitudinal direction, y represents the latitudinal direction, and z represents the perpendicular direction or vertical direction in a vehicle body structure, e.g., a motor vehicle.

As is apparent from FIG. 1, the longitudinal beam 1 is provided with a recess 13 that is arranged in at least one side wall 6 of the beam 1. In the example illustrated, the recess 13 is rectangular, and discloses a shape and dimension that is adjusted according to the cross-section of the cross beam, thereby enabling the cross beam to be accommodated in the recess 13. This is limited by two side edges 14 of the side wall 6, from which a connecting flange 15 projects transversely on both sides of the recess 13. The connecting flange 15 is intended for connection to the respective side wall 4, 5 in the transversal beam 2, which shall be described more in detail hereinafter. The recess 13 is additionally limited by a lower edge formed by means of a connecting flange 16, which is constituted by a projection from the transverse wall 11 of the beam 1. This projection is intended for connection to the underside of the transverse wall 10 in the cross beam 2.

In one end section thereof, the cross beam 2 discloses two connecting flanges 17 that project sideways from each side wall 4, 5 of the cross beam 2. These flanges and are situated in a joint plane that forms a connecting plane for the cross beam 2. The two connecting flanges 15 of the longitudinal beam 1 that protrude from the side wall 6 form, together with the side walls 4, 5 of the cross beam 2, a connecting surface that extends in the yz-direction. The lower connecting flange 16 in the longitudinal beam 1, together with the underside of the transverse wall 10 in the cross beam 2, forms connecting surfaces in the xy-direction. The two connecting flanges 17 in the cross beam 2 form, together with the second side wall 7 in the longitudinal beam 1, connecting surfaces in the xz-direction.

As is apparent from FIG. 1, the longitudinal beam 1 and the cross beam 2 have a respective explicit essential extension, or more precisely, the x-direction and y-direction, respectively. The beam foot 3 has a more complex structure, even though its essential extension outwards from the beam knot is perpendicular, i.e., in the z-direction. In fact, the beam foot 3 is essentially L-shaped, having two legs transversely arranged in relation to each other. The vertical leg 18 forms a beam connection to a vertical beam, which is intended to form part of the vehicle body structure, whereas the second leg 19 is a horizontally directed leg, forming an anchor section in the beam knot.

Accordingly, the two side walls 8, 9 of the beam foot 3 are also essentially L-shaped, as well as the transverse wall 12. As such, the transverse wall 12 thereby extends in two planes which are transversely arranged in relation to each other and, in addition, forms a softly beveled transition section 20. The transition section 20 serves in, among other things, securing a high degree of rigidity in the beam knot.

In the illustrated example, the beam foot 3 discloses two connecting flanges 21 that form a connection to a part of the vehicle body structure (not shown). At the base, the beam foot 3 discloses a recess that essentially corresponds to the height of the connecting flanges 17 in the cross beam 2. The lying or horizontal part of the side walls 8, 9 form connecting surfaces for cooperating with the side walls 4, 5 in the cross beam 2, which likewise form connecting surfaces in connection with one end section of the beam and that extend in the yz-direction.

In the example shown in FIG. 1, a cover plate 22 is also shown. The cover plate may be, for example, a floor panel forming part of the vehicle body structure. The cover plate 22 discloses a recess 23 for accommodating the beam foot 3, including the beveled section 20 of the foot 3. In order to form rest surfaces and connecting surfaces against the cover plate, the cross beam 2 is provided with additional connecting flanges 24 that protrude sideways from the side walls 4, 5 of the beam 2. Furthermore, the longitudinal beam 1 discloses a connecting flange 25 formed by a raised section of the side wall 7, to which a connecting flange 28 on the cover plate 22 is intended to be connected.

Figure 2:
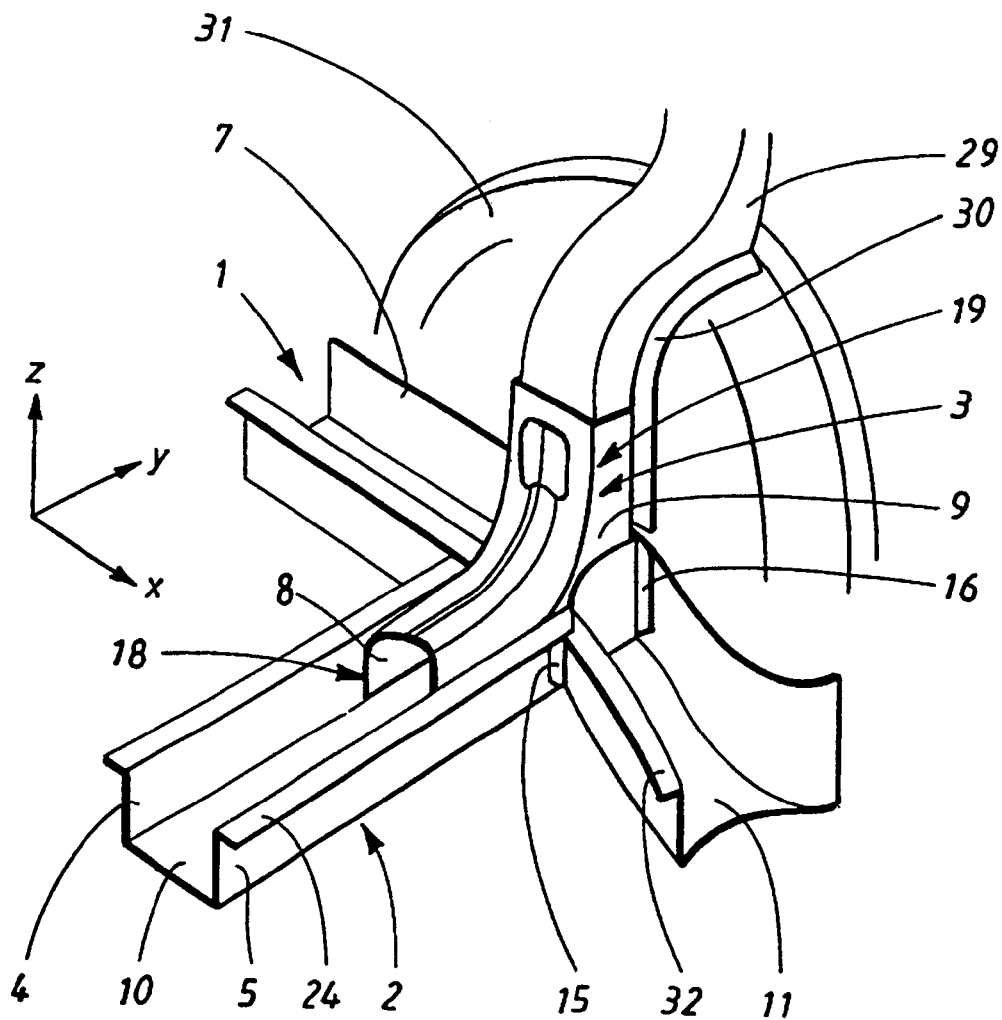
FIG. 2 is a perspective view of an embodiment of the present invention illustrating a practical embodiment of the beam knot according to the invention in assembled state.

Thus, in FIG. 2, a practical embodiment of the beam knot according to the invention is shown in its assembled state, where the included beam elements are slightly modified in their design in relation to the example according to FIG. 1. However, corresponding parts have the same reference numerals as in FIG. 1.

The beam knot according to the invention is assembled by situating one end section of the second beam element 2 inside the first beam element 1. More precisely, the end section is inserted through the recess 13 (see FIG. 1) and connects to the side wall 7 in the first beam element 1. In this regard, the two connecting flanges 16 bear against the inside of the side wall 7 in joint connecting surfaces essentially in a joint xz. These connecting flanges 16 are attached to the inside of the side wall 7 by means of, for example, spot welding. Further, the connecting flanges 15 of the first beam element 1 connect to the outside of the side walls 4, 5 of the second beam element 2. These flanges 15 are attached to these side walls 4, 5 in their respective connecting surfaces in a respective yz-plane by means of, for example, spot welding. The base of the second beam element 2, i.e., the transverse wall 10, rests against the inside of the base of the first beam element 1, i.e., its transverse wall 11, as well as the protruding connecting flange 16 (see FIG. 1). These bases may, in the joint connecting surfaces which have been formed, be attached here, for example, by means of spot welding, if a high-strength connection is required.

Next, the third beam element 3, i.e., the beam foot 3, is placed inside the second beam element 2. This involves partially situating the beam foot 3 inside the first beam element 1, and inserting one of its legs 18 into the second beam element 2. In this manner, the side walls 8, 9 of the horizontal leg 18 of the beam foot 3 bear against the inside of the side walls 4, 5 of the second beam element 2, and are attached to these at a required number of places along the joint connecting surfaces. Thus, parts of the side walls of the third beam element 3 are overlapping, i.e., they overlap parts of the side walls of the second beam element 2. The profile form of the beam foot 3 is selected so that it preferably forms a reversed or upside down U, whereas the first and second beam elements 1, 2 in cross-section preferably form a U turned the right way round.

In the embodiment illustrated in FIG. 2 an additional beam 29 is also shown. This beam 29 forms part of the vehicle body structure and connects to the upwardly directed leg 19 of the beam foot 3 by means of the fact that it inserts into the leg 19. The beam 29 can be attached by, for example, spot welding to the beam foot 3 in overlapping surfaces. The beam 29 discloses one or more connecting flanges 30 that are intended to be attached to a cover plate 31 of a wheel housing by means of, for example, spot welding, forming part of the structure. The cover plate 31 connects to the outside of the side wall 7 of the first beam element 1 and is attached to this by means of, for example, spot welding. In the example according to FIG. 2, the first beam element is curved in order to adjust to the form of the cover plate 31 and discloses a connecting flange 32 at the upper edge of its side wall 6, which connecting flange is intended to support a cover plate 22 together with the upwardly turned connecting flanges 24 of the second beam element, which is shown in FIG. 1.

In summary, the beam knot according to the invention has the following construction. The longitudinal side beam discloses a recess in the 13 interior side wall. The cross beam inserts into the side beam and discloses such a width that the side walls of the cross beam bear against the edges of the recess. The cross beam extends right up to the exterior side 7 wall of the longitudinal beam and is mounted in this beam. The vertical beam discloses such a width, that the side walls of the vertical beam bear against the side walls of the cross beam. The vertical beam extends right up to the transverse 10 wall of the cross beam and is mounted in this. The exterior part of the vertical beam extends towards the exterior side wall of the longitudinal beam. One essential feature is constituted by the fact that the width of the recess of the longitudinal beam substantially corresponds to or slightly exceeds the width of either the cross beam or the vertical beam, and that the remaining beam is inserted into the beam structure and discloses a width which corresponds to the remaining opening.

As part of the vehicle body structure, a beam knot according to the present invention preferably has at least three beam elements 1, 2, 3. Each beam element 1, 2, 3 has two side walls 4, 5, 6, 7, 8, 9 extending with relative intervals, and at least one transverse wall 10, 11, 12 connecting the side walls 4, 5, 6, 7, 8, 9. The beam elements 1, 2, 3 are rigidly connected with each other in the beam knot, and protrude from the knot in respective directions in the vehicle's driving direction (x), as well as vertically (z) to the vehicle, and sideways (y) transversely to the driving direction (x).

The beam knot is comprised of a first beam element 1 of said beam elements extending in the driving direction (x) and having a recess in one side wall thereof. The beam knot is further comprised of a second beam element 2 extending sideways (y) transversely to the driving direction and inserting transversely through the recess with a section and connecting with the opposite side wall. The beam knot is further comprised of a third beam element 3 that is partly situated in the first beam element 1 and, with its side walls, connects with at least the side walls of the second beam element 2 and extends vertically with a section. The first and the second beam elements, in one embodiment, form part of a floor structure in the vehicle body structure, while the third beam element connects to a side structure of the vehicle body structure.

In other embodiments of the present invention, it is possible to arrange the connecting flanges so that they have another location and extension and direction. Furthermore, it is possible that the beam foot is situated in the second beam element even before this is situated in the first beam element. Furthermore, by means of limitation of the length of the flanges 24, it is possible to let the side walls 8, 9 of the beam foot extend on the outside of the side walls 4, 5 of the second beam element. Furthermore, it is possible that the beam elements have another profile form than a U-profile form, for example a box-profile form, but in this regard, it is necessary that at least the first and the second beam element disclose recesses, i.e. a U-profile form in those sections where the other beam elements are situated. Of the shown beam elements, only the beam foot is in practice shown in its entirety, whereas the other beam elements are shown cut off and in practice have a greater extension with a length which is adjusted to the case in question. The beam foot 3 and the upwardly directed beam element 29 can be constructed as one single element. The cover plates 22, 31 and the connecting flanges 24, 25, 32 do not primarily form part of the beam knot and can be replaced by other elements.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A beam knot forming part of a vehicle body structure, comprising:
   at least three beam elements, each element further comprising
      two side walls that extend with relative intervals, and
      at least one transverse wall for connecting the side walls,
      wherein the beam elements are rigidly connected with each other in the beam knot and protrude from the knot in respective directions,
   wherein a first beam element of the at least three beam elements comprises a recess in one side wall thereof, wherein the recess is limited by two side edges,
   wherein a second beam element of the at least three beam elements inserts transversely through the recess with a section and is connected with the opposite side wall of the first beam element, and
   wherein the second beam element discloses a width between its side walls which corresponds to the width of the recess between its side edges, and
   wherein a third beam element of the at least three beam elements is partly situated in the first beam element and, with its side walls, is connected with at least the side walls of the second beam element and connects to the opposite side wall of the first beam element.

2. The beam knot according to claim 1, wherein at least parts of the side walls of the third beam element overlap at least parts of the side walls of the second beam element.

3. The beam knot according to claim 2, wherein the third beam element inserts into the second beam element so that parts of its side walls connect to and are attached to the side walls of the second beam element.

4. The beam knot according to claim 2, wherein the profile form of the first and the second beam element is a U turned the right way round, whereas the profile form of the third beam element is a reversed U.

5. The beam knot according to claim 1, wherein the third beam element is constituted by an essentially L-shaped beam foot having a first leg which extends in the longitudinal direction of the second beam element and a second leg which extends transversely to the first leg and the first beam element.

6. The beam knot according to claim 1, wherein the first beam element discloses connecting flanges which form side edges of the recess and extend in the longitudinal direction of the second beam element.

7. The beam knot according to claim 1, wherein the second beam element discloses connecting flanges in the section thereof which inserts into the first beam element, said connecting flanges connecting to the side wall in the first beam element.

8. A beam knot forming part of a vehicle body structure and having at least three beam elements, each beam element having two side walls extending with relative intervals and at least one transverse wall connecting the side walls, wherein the at least three beam elements are rigidly connected with each other in the beam knot and protrude from the knot in respective directions in the vehicle's driving direction as well as vertically to the vehicle, as well as sideways transversely to the driving direction, the beam knot comprising:
   a first beam element of said beam elements extending in the driving direction and having a recess in one side wall thereof,
   a second beam element of the at least three beam elements extending sideways transversely to the driving direction and inserting transversely through the recess with a section and connecting with the opposite side wall, and
   a third beam element of the at least three beam elements being partly situated in the first beam element and, with its side walls, connecting with at least the side walls of the second beam element and extending vertically with a section, wherein the first and the second beam elements form part of a floor structure in the vehicle body structure, and wherein the third beam element connects to a side structure of the vehicle body structure.

* * * * *